United States Patent
Tan et al.

(10) Patent No.: US 6,197,921 B1
(45) Date of Patent: Mar. 6, 2001

(54) POLYMERS OF 1-(BITHIEN-2-YL)-4-AMINOBENZENE

(75) Inventors: Loon-Seng Tan, Centerville; Balasubramanian Sankaran; Devdatt S. Nagvekar, both of Dayton, all of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/323,646

(22) Filed: Jun. 1, 1999

(51) Int. Cl.$^7$ .................................................. C08G 75/00
(52) U.S. Cl. ............................................................. 528/380
(58) Field of Search ............................... 528/380; 526/256

(56) References Cited

U.S. PATENT DOCUMENTS

| | | |
|---|---|---|
| 4,940,517 | 7/1990 | Wei . |
| 5,527,434 | 6/1996 | Hamnett et al. . |

OTHER PUBLICATIONS

D. Nagvekar, B. Sankaran, L–S Tan, Synthesis and Electrochemical Characterization of Electro–Active Monomers Containing Directly Bonded Aniline–Thiophene, Aniline–bithiophene and Anilne–Ethylenedioxythiophene Structures, Polymer Preprints, vol. 39, No. 2, Aug. 1998, pp 548–549, published Jul. 16, 1998.

S.C. Ng, L.G. Xu, H.S.O. Chan, A novel conductive polymer: poly[4–(2–thienyl)benzenamine], J. Mater. Sci. Letters, 16(1997), 1738–1740. (no month given.).

J. Guay, M. Leclerc, L.H. Dao, Conducting polymer derived from 4–aminobiphenyl, J. Electroanal. Chem., 251(1988), 31–39. (no month given.).

D.R. McKean, G. Parrinello, A.F. Renaldo, J.K. Stille, Synthesis of Functionalized Styrenes via Palladium–Catalyzed Coupling of Aryl Bromides with Vinyl Tin Reagents, J. Org. Chem., 1987, 52, 422–424. (no month given.).

S.C. Ng, L. Xu, Poly[4–(2–heteroaryl)benzenamines]:Novel Electrically Conducting Alternating Copolymers of Aniline and Chalcophenes, Adv. Mater. 1998, 10, No. 18, pp1525–1529. (no month given.).

*Primary Examiner*—Christopher Henderson
(74) *Attorney, Agent, or Firm*—Charles E. Bricker; Thomas L. Kundert

(57) ABSTRACT

Provided are polymers prepared by the polymerization of monomers of the formulae:

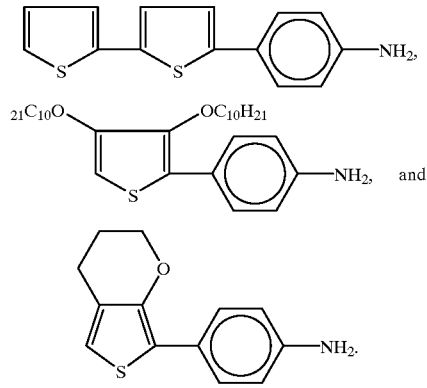

1 Claim, No Drawings

POLYMERS OF 1-(BITHIEN-2-YL)-4-AMINOBENZENE

RIGHTS OF THE GOVERNMENT

The invention described herein may be manufactured and used by or for the Government of the United States for all governmental purposes without the payment of any royalty.

BACKGROUND OF THE INVENTION

The present invention relates to conducting polymers and their use as electrodes in various devices, and, in particular, to polymers resulting from electropolymerization of novel aniline-thiophene monomers.

The electrical conductivity ($\sigma$) of most organic materials at room temperature is quite small ($\sigma < 10^{-10}$ ohm$^{-1}$ cm$^{-1}$). Over the last two decades, the synthesis of organic molecules with electrical properties approaching those of metals have been the focus of considerable attention. Because organic polymers generally have elasticity, strength and plasticity, they offer significant advantages over non-polymeric materials in the manufacture of electronic materials. Macromolecular substances can now be tailored to perform as semiconductors or even as true organic metals.

The field of organic metals is dominated by two types of molecular structures: linearly conjugated $\pi$-systems and charge-transfer complexes which form stacks of $\pi$-systems in the solid state. In the former systems, electrons move rapidly along a partially oxidized or reduced molecular chain. Examples of linear $\pi$-conjugated systems are polypyroles, polythiophenes, polyanilines, polyacetylenes and polyarylenes. In charge-transfer complexes, electrons move along a partially oxidized or reduced stack molecules. In either case, the electrical, optical and magnetic properties are a complex function of the solid state structure, and efforts have been made to prepare and study model compounds for these systems, primarily in solution.

Among the families of organic synthetic metals, poly(thiophene) (PTh) and polyaniline (PANI) a nd their derivatives may be the most extensively prepared and studied systems in recent years. While the former, as a whole, has generally higher p-doped conductivity, the latter enjoys a better temporal stability with respect to conductive properties at ambient conditions.

We have synthesized new electro-active monomers, as well as polymers therefrom, comprising thiophene and aniline units linked by a direct C—C bond.

Accordingly, it is an object of the present invention to provide new polymers.

Other objects, aspects and advantages of the present invention will be apparent to those skilled in the art from a reading of the following detailed disclosure of the invention.

SUMMARY OF THE INVENTION

In accordance with the present invention there are provided novel polymers produced by the polymerization of monomers of the formulae:

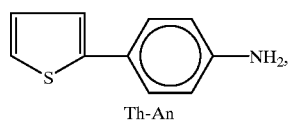

Th-An

-continued

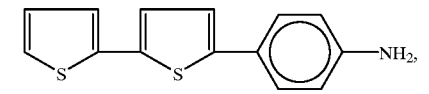

Th-Th-An

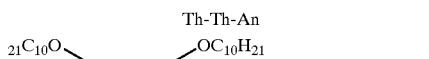

C$_{10}$OThC$_{10}$O-An

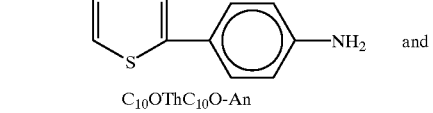

EDOT-An

These monomers are synthesized by the palladium-catalyzed coupling reaction of 1-halo-4-nitrobenzene with the corresponding 2-(tributylstannyl)thiophene, followed by reduction of the nitro intermediates, as shown in the examples which follow. The coupling reaction works well in dioxane or toluene at reflux with tetrakis-(triphenylphosphine)palladium(0), Pd(PPh$_3$)$_4$.

These monomers are preferably electrochemically polymerized. Electrochemical polymerization of the above-described monomers can be carried out according to the methods generally employed for electrochemical polymerization of thiophene, pyrrole, and the like. The electrochemical copolymerization is carried out by cyclic voltammetry, by subjecting a mixture of monomer, solvent and electrolyte to one of the following conditions: (a) setting the potentiostat at a constant electrical potential where the monomer is optimally oxidized; (b) setting the potentiostat at a constant current value; or (c) repeated scanning between the redox potentials of the monomers. Typically, all three conditions are tested for a new monomer in order to select one as the optimal condition for achieving electropolymerized polymer films with the required stability and thickness. If the oxidation-reduction cycle can be repeated several times and the polymer film deposited on the electrode exhibits reproducible cyclic voltammetric (current-voltage) characteristics, it is then deemed to be electrochemically stable and well-behaved.

The solvents which can be used in the present invention may be either aqueous or nonaqueous, although a solution of the aforesaid electrolyte in a nonaqueous organic solvent is preferred. The organic solvents used herein are preferably aprotic and have high dielectric constants. For example, ethers, ketones, nitrites, amines, amides, sulfur compounds, phosphoric ester compounds, phosphorous ester compounds, boric ester compounds, chlorinated hydrocarbons, esters, carbonates, nitro compounds and the like can be employed. Of these, ethers, ketones, nitriles, phosphoric ester compounds, phosphorous ester compounds, boric ester compounds, chlorinated hydrocarbons and carbonates are preferred. Specific examples of suitable solvents include tetrahydrofuran, 2-methyltetrahydrofuran, 1,4-dioxane, acetonitrile, propionitrile, 4-methyl-2-pentanone, butyronitrile, valeronitrile, benzonitrile, 1,2-dichloroethane, gamma-butyrolactone, valerolactone, dimethoxyethane, methylformate, propylene carbonate, ethylene carbonate, dimethylformamide, dimethyl sulfoxide, ethyl phosphate, methyl phosphate, ethyl phosphite, methyl phosphite, 3-methylsulfolane, etc. Among these, nitriles and carbonates are especially preferred in order to increase the response speed. These organic solvents may be used alone or in combination.

Specific examples of electrolyte which can be used in the present invention include tetraphenylarsonium chloride, tetraphenylphosphonium chloride, tetra(n-butyl)ammonium bromide, lithium bromide, tetra(n-butyl)ammonium hexafluorophosphate, and tetra(n-butyl)ammonium perchlorate (TBAP). These examples are merely illustrative and not limiting.

Within the context of the implementation of the process in accordance with the invention, the electrochemical reactions are advantageously carried out at the surface of an electrode. By measuring the current delivered during the reaction, the electrode effectively makes it possible to monitor the progress of the polymerization reaction (for example the thickness of the polymer formed) or the progress of subsequent reactions carried out on the copolymer.

The resulting polymers have repeating units of the formula:

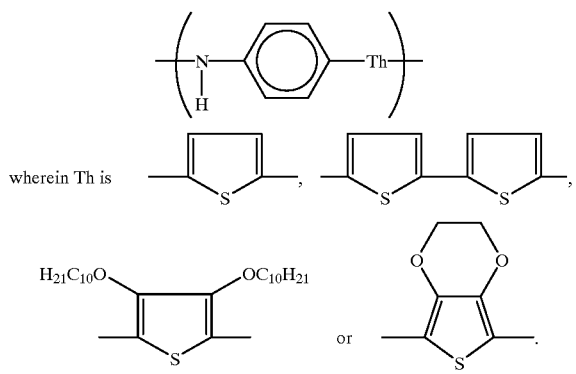

The following examples illustrate the invention:

In the examples which follow, electrochemical characterization and electropolymerization experiments were conducted using an EG&G Princeton Applied Research Model 273 potentiostat/galyanostat; these experiments were conducted in a three-electrode cell containing 10 mM monomer and 0.1 M tetra-n-butylammonium perchlorate (TBAP) in $CH_3CN$ (Th—An) or $CH_2Cl_2$ (Th—Th—An, EDOT—An and $C_{10}OThOC_{10}$—An). Gold button cell and platinum plate were used as the working and counter electrodes. Freshly prepared 0.1M $Ag/Ag^+$ in $CH_3CN$ was used as a reference electrode. The electrochemical cell was enclosed in an inert chamber with a positive nitrogen gas flow throughout the experiment. The nitrogen gas was passed through a purifier before entering the chamber. A standard scan of the electrolyte/solvent system revealed the system to be electrochemically stable between 1.2 V and −1.0 V. A scan rate of 25 mV/s was typically used.

The following examples illustrate the invention:

COMPARATIVE EXAMPLE

Electropolymerization of 4-(2-Thienyl)aniline (Th—An)

During the first scan of the sample, an anodic wave with two oxidation inflections at 0.2 V and 0.75 V, peaking at 0.35 V($E_{pa,1}$) and 0.9 V ($E_{pa,2}$), and two reduction peaks at −0.1($E_{pc,1}$) and −0.45 V($E_{pc,2}$) was observed. Cycling the potential between +0.4 and −0.6 V showed an oxidation peak at 0.35 V, but no reduction peak was detected. Although the sample displayed reversible redox behavior when subjected to repeated scanning, there was no polymer deposited onto the electrode. Slowly increasing the cell potential from +0.4 to +0.7 V at 100 mV increments, and repeatedly scanning to −0.6 V did not lead to any polymer growth on the electrode surface. The surface of the electrode became bluish at the oxidation potential while scanning, but became clear at −0.6 V or when the applied potential was cut off. Similar phenomenon was observed while trying to grow a film at a constant potential of +0.4 V. Scanning the potential between +0.9 and −0.6 V led to polymer growth onto the electrode surface. The first scan produced two oxidation peaks and two reduction peaks. Successive scans produced a first oxidation peak which was at a higher potential than the previous one. During 5 consecutive scans, the first oxidation peak continued to move further away from the initial peak and nearly merged with the second oxidation peak. The anodic current kept on increasing with each successive scan, indicative of polymer growth. Similarly, the amount of the cathodic current also increased with each scan but the reduction peak remained the same. The polymer thus grown was dark blue in its oxidized form, and light gray in its reduced form.

The polymer on the Pt electrode was washed with electrolyte/solvent solution and scanned in a monomer free electrolyte. The polymer showed well-behaved redox peaks when scanned between 0.35 V and −0.6 V. Even after 10 scans there was little change in the redox peak currents. The redox behavior was reversible and reproducible between these two potentials.

EXAMPLE 1

Electropolymerization of 1-(bithienyl-2-yl)-4-aminobenzene (Th—Th—An)

Scanning the sample between +0.4 and −0.6 V resulted in one oxidation inflection at 0.21 V ($E_{ox}$), peaking at 0.4 V, and two reduction peaks at 0.01 and −2.23 V. Polymer was deposited onto the electrode but was very sparse. The anodic potential was increased at 0.05 V increments while keeping the cathodic potential constant at −0.6V. As the anodic potential was increased in a step-wise fashion to 0.8 V, there was another gradual inflection around 0.8 V. The reduction peak at 0.01 V, while increasing in current, shifted to −1.2 V, and eventually coalesced with the peak at −2.2 V. There was little or no increase in the reduction peak at −2.2 V. As the anodic potential was stepped higher, then the reduction peaks once again separated into two peaks. At the oxidation potential of 0.95 V, the reduction peaks appeared at −0.04 and −0.30 V. The amount of polymer deposited onto the electrode also increased with an increase in the anodic potential.

EXAMPLE 2

Electropolymerization of 1-(3,4-ethylenedioxythien-2-yl)-4-aminobenzene (EDOT—An)

The first scan of the sample between +0.4 V and −0.4 V revealed an oxidation inflection at $E_{(ox)}$=0.16, peaking at 0.35 V ($E_{pc}$), and two reduction peaks at $E_{(pc,1)}$=0.03 V and $E_{(pc,2)}$=−0.13 V. Raising the potential to 0.8 V did not detect any other oxidation peaks. The polymer was dark blue in the oxidized state. To enhance the growth of polymer onto the electrode, potential cycling was conducted between +0.5 V and −0.4 V. After the first scan, the successive scans did result in an increase in the current at the oxidized peak, although the reduction peak showed only a marginal increase in the current. The second and third scans showed an oxidation peak for the polymer that was deposited onto the electrode.

The polymer-coated Pt-electrode was washed in the electrolyte solution and its redox behavior was studied in a monomer-free electrolyte solution. The polymer was scanned between +0.3 and −0.4 V. In the first scan, the polymer showed a small oxidative current at 0.3 V and a large ( nearly 8 times to oxidative current) reductive current (at −0.26 V). Successive scans did not reveal any peak. At the reduction voltage, the polymer seemed to dissolve into the solution and the electrode became clear. Similar behavior was also observed for the polymer grown at the constant potential of 0.4 V. This also explains the constant current of the oxidation peaks in the CV of the polymer growth by scanning, since after every reduction most of the polymer dissolved into solution, and new polymer was deposited only with successive scans and there was no build up of the polymer.

EXAMPLE 3

Electropolymerization of 1-(3,4-didecyloxythien-2-yl)-4-aminobenzene ($C_{10}OThOC_{10}$—An)

Scanning the sample between +0.5 V and −0.5 V revealed an oxidation inflection at 0.22 V, peaking at 0.4 V and two reduction peaks at $E_{(c1,p)}$=0.15 and $E_{(c2,p)}$=−0.26 V. Re-scanning between these two potentials did not lead to any polymer growth onto the electrode. However, when scanning window was widened from +0.9 to −0.5 V, a new oxidation peak at 0.77 V, peaking at 0.9 V was detected, along with the two reduction peaks, $E_{(c1,p)}$ and $E_{(c2,p)}$. Cycling between these two potentials also did not result in any polymer growth. Apparently, the polymer formed was very soluble in $CH_2Cl_2$. An attempt to grow the polymer at constant potential was unsuccessful because the polymer was too soluble to adhere to the electrode.

In a separate experiment, electropolymerization was conducted under acidic conditions with Ag/AgCl as reference electrode. The monomer was dissolved in a mixture of 2 M HCl:$CH_3CN$ (v/v 1:1.5). Initial cyclic voltammetric scan of the resultant monomer solution showed an oxidation potential inflection $E_a$=0.57 V with a cathodic peak at 0.28 V ($E_{c,p}$). Repeated scanning of the monomer solution between 0.85 and −0.1 V led to polymer growth at the electrode. The polymer film could also be electrodeposited potentiostatically at 0.9 V. However, the polymer deposition was not dense. The polymer was stable and reversible in monomer-free solution between 0.8 and −0.1V.

The monomers of this invention are useful in the fabrication of electrochromic and electrically conducting materials. The thin polymer films resulting from electropolymerization of these monomers are useful as electrochromic materials in electronic display devices, electrochromic windows and devices which require changes in color and degree of light transmittance.

Various modifications may be made to the invention as described without departing from the spirit of the invention or the scope of the appended claims.

We claim:

1. A polymer prepared by the polymerization of 1-(bithien-2-yl)-4-aminobenzene.

* * * * *